(12) United States Patent
Yao et al.

(10) Patent No.: US 11,176,371 B2
(45) Date of Patent: Nov. 16, 2021

(54) ENVIRONMENT MONITORING METHOD AND ELECTRONIC DEVICE

(71) Applicant: Ping An Technology (Shenzhen) Co., Ltd., Shenzhen (CN)

(72) Inventors: Xi Yao, Sunnyvale, CA (US); Qi Chen, Santa Clara, CA (US); Ruei-Sung Lin, Redwood City, CA (US); Bo Gong, Belmont, CA (US); Yi Zhao, Santa Clara, CA (US); Mei Han, Palo Alto, CA (US); Jinghong Miao, San Jose, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 217 days.

(21) Appl. No.: 16/727,763

(22) Filed: Dec. 26, 2019

(65) Prior Publication Data
US 2021/0200981 A1    Jul. 1, 2021

(51) Int. Cl.
*G06K 9/00*    (2006.01)
*G06K 9/46*    (2006.01)
*G06K 9/62*    (2006.01)

(52) U.S. Cl.
CPC ......... *G06K 9/0063* (2013.01); *G06K 9/4642* (2013.01); *G06K 9/6251* (2013.01); *G06K 9/6256* (2013.01)

(58) Field of Classification Search
None
See application file for complete search history.

(56) References Cited

U.S. PATENT DOCUMENTS

2021/0150230 A1*    5/2021    Smolyanskiy .... B60W 60/0027

OTHER PUBLICATIONS

Li, Weijia, et al. "Large-scale oil palm tree detection from high-resolution satellite images using two-stage convolutional neural networks." Remote Sensing 11.1 (2019): 11. (Year: 2019).*
Wu, Fei, et al. "Inshore ship detection based on convolutional neural network in optical satellite images." IEEE Journal of Selected Topics in Applied Earth Observations and Remote Sensing 11.11 (2018): 4005-4015. (Year: 2018).*

* cited by examiner

*Primary Examiner* — Sean M Conner
(74) *Attorney, Agent, or Firm* — ScienBiziP, P.C.

(57) ABSTRACT

An environment monitoring method and an electronic device are provided, the method divides the satellite image into a plurality of first divided images with overlapping areas, a first multi-dimensional feature map is obtained by inputting the plurality of first divided images into an environment monitoring model, the environmental monitoring model fully combines the correlation between the environmental information of different dimensions, the environmental features of a plurality of different dimensions are correlated through an association network. By utilizing the environment monitoring method, a large area of the environment monitoring effectively is realized, and accuracy of environmental detection is improved.

20 Claims, 5 Drawing Sheets

ENVIRONMENT MONITORING METHOD AND ELECTRONIC DEVICE

FIELD

Embodiments of the present disclosure relates to technical fields of image processing, specifically to an environment monitoring method and an electronic device.

BACKGROUND

In order to better control environmental pollution, environment needs to be monitored. At present, environment is manually inspected and environmental quality has to be regularly monitored with the help of cameras or other monitoring instruments. Such a monitoring way requires a lot of manpower and material resources. In addition, such a monitoring method is not efficient, lacks of flexibility and mobility, and unable to quickly respond to large-scale environmental changes.

Therefore, an effective monitor environment method and device is desired.

DETAILED DESCRIPTION

In order to enable those skilled in the art to better understand the solution of the present disclosure, the technical solutions in the embodiments of the present disclosure will be described below with reference to drawings in the embodiments of the present disclosure. Obviously, described embodiments are merely embodiments which are a part of the present disclosure, rather than every embodiment. All other embodiments obtained by those of ordinary skill in the art based on the embodiments of the present disclosure without creative efforts should be within the scope of the present disclosure.

Terms such as "first", "second" in the specification and claims of the present disclosure and the above drawings are used to distinguish different objects, and are not intended to describe a specific order. Moreover, terms "include" and any variations of the "include" are intended to indicate a non-exclusive inclusion. For example, a process, a method, a system, a product, or a device which includes a series of steps or units is not limited to listed steps or units, but optionally, also includes steps or units not listed, or optionally, also includes other steps or units inherent to these processes, methods, products, or equipment.

Figure 1:
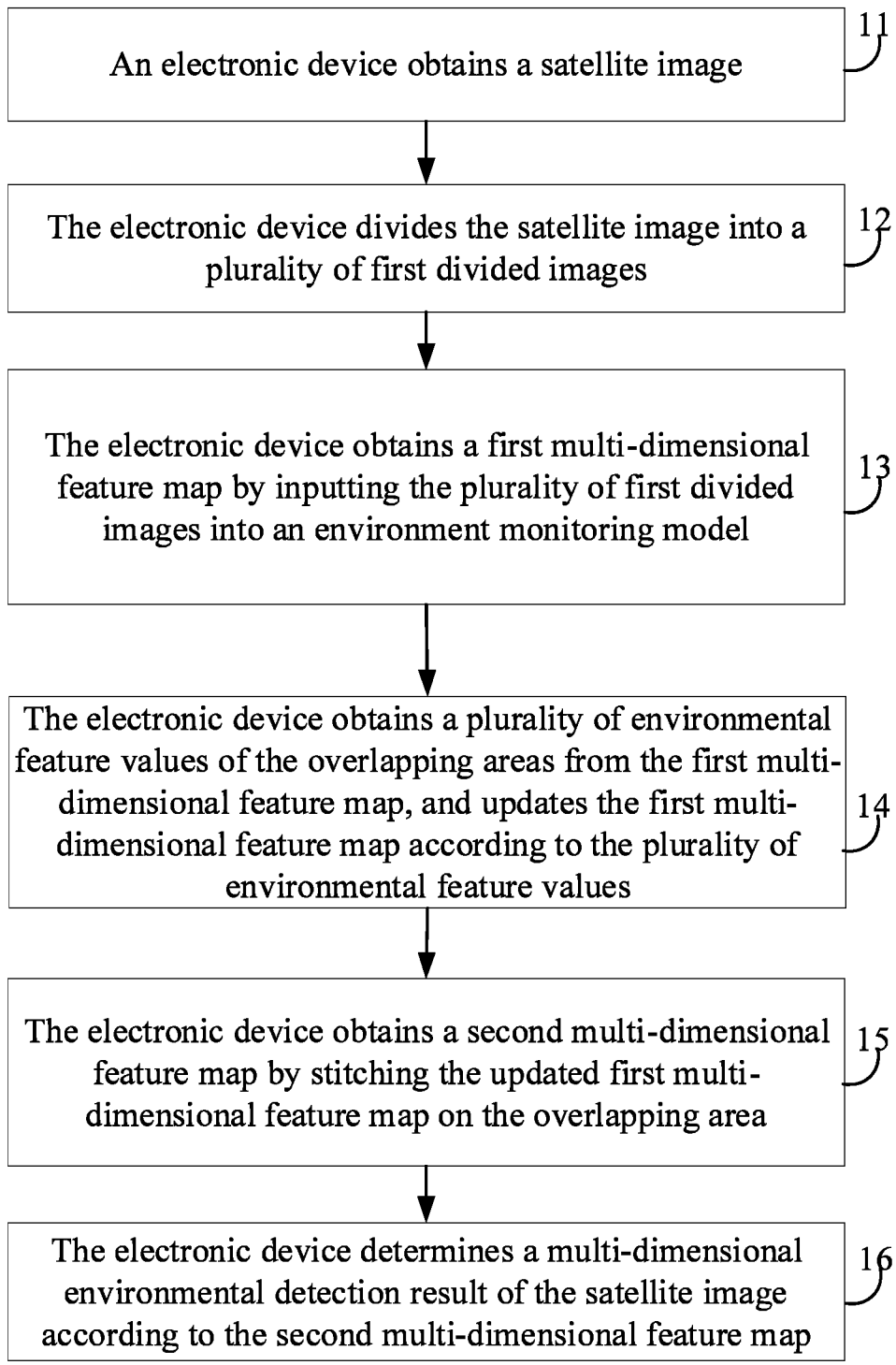
FIG. 1 is a flowchart of one embodiment of an environment monitoring method.

FIG. 1 is a flowchart of one embodiment of an environment monitoring method. Depending on the embodiment, additional blocks may be added, others removed, and the ordering of the blocks may be changed.

In block 11, the electronic device obtains a satellite image.

In one embodiment, the electronic device can automatically perform numerical calculations and/or information processing according to instructions preset or stored in advance. Hardware of the electronic device includes, but is not limited to, a microprocessor, an application specific integrated circuit (ASIC), and a field programmable gate Arrays (FPGAs), digital processors (DSPs), embedded devices, for example.

The electronic device may also be a network device and/or user equipment. The network device includes, but is not limited to, a single network server, a server group including a plurality of network servers, or a cloud including a large number of hosts or network servers. The user equipment includes, but is not limited to, any electronic product that can interact with a user through a keyboard, a mouse, a remote controller, a touch panel, or a voice control device, such as, a personal computer, a tablet computer, a smart phone, and a personal digital device, and assistant Personal Digital Assistant (PDA), for example.

In one embodiment, the electronic device can obtain the satellite image from other device, which acquired the satellite image from one satellite.

The satellite image may be an environmental image of any region that needs to be monitored. Wave bands of the satellite image band may include at least four wave bands, such as red, green, blue (RGB) and near infrared (NIR).

In block 12, the electronic device divides the satellite image into a plurality of first divided images.

In one embodiment, the satellite image can be divided into square areas having a same size according to a preset area size, and each of the square areas is denoted as the first divided image.

In order to make image stitching smoother, when the satellite image is divided, it is needed to ensure that each two adjacent images of the plurality of first divided images are overlapped to define overlapping areas, and an image content of the overlapping areas is the same. A size of the overlapping areas can be set as required, such as one overlapping area is a half of a total area of a first divided image.

In block 13, the electronic device obtains a first multi-dimensional feature map by inputting the plurality of first divided images into an environment monitoring model.

In one embodiment, the environment monitoring model includes a semantic segmentation network and an association network, the association network being adapted for associating a plurality of dimensional environmental features.

The association network includes a plurality of first convolution layers where environmental features of different dimensions are extracted, and a plurality of second convolution layers that the environmental features of different dimensions are associated.

The first multi-dimensional feature map is a feature map of a plurality of different dimensions, such as a feature map of surface division, a feature map of eutrophic water bodies, and a feature map of black odor polluted water bodies.

Figure 2:
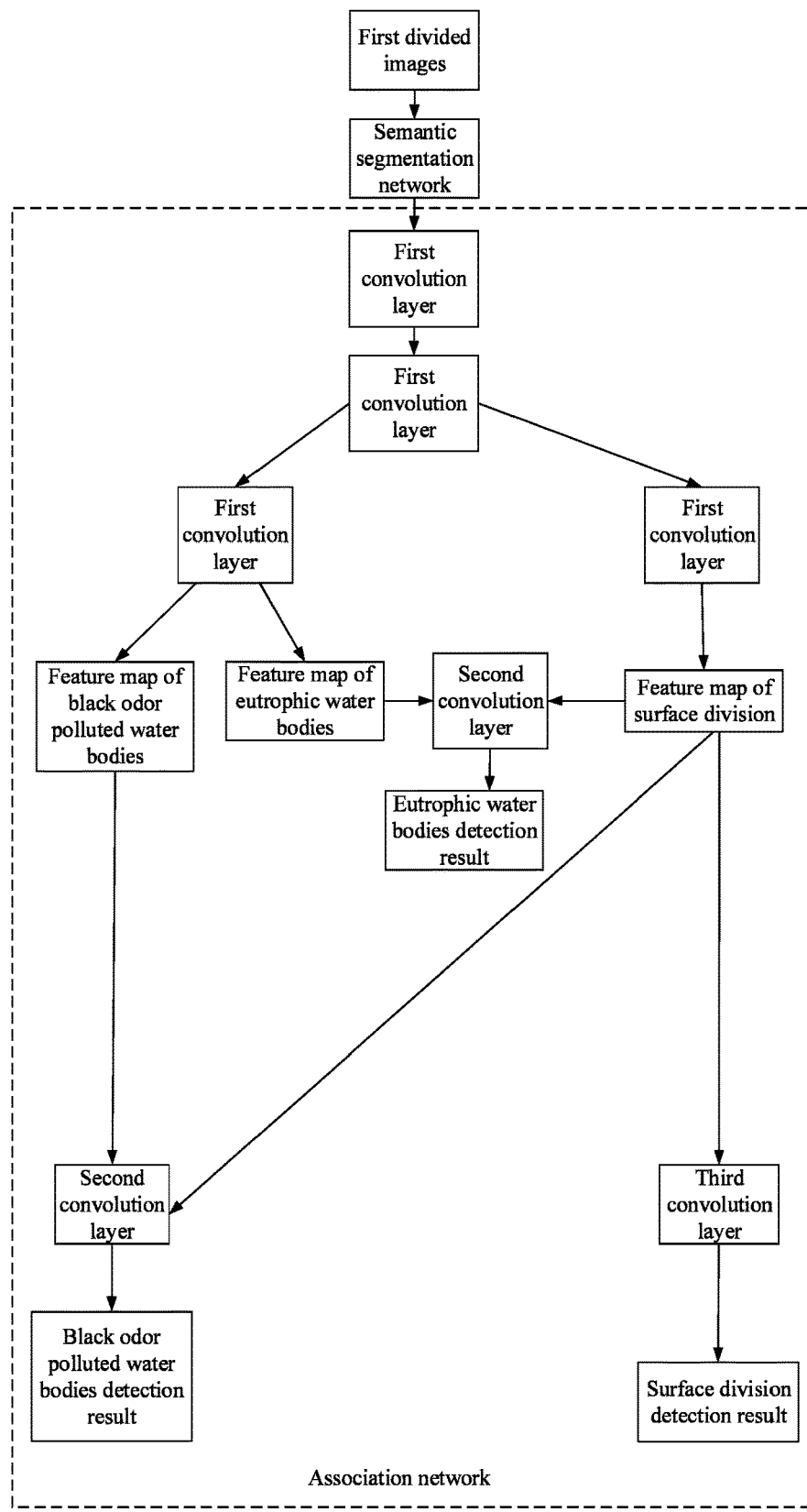
FIG. 2 is a diagram of one embodiment of a network architecture of an environmental monitoring model.

FIG. 2 is a diagram of one embodiment of a network architecture of an environmental monitoring model.

As shown in FIG. 2, the environment monitoring model includes the semantic segmentation network and the association network. For example, the semantic segmentation network is U-Net or DeepLabV3+.

A plurality of first divided images are input into the semantic segmentation network, and feature maps having a w*h*c size are obtained. W represents a length of the feature maps, h represents a width of the feature maps, and c represents a number of channels of the feature maps. Then, the feature maps are input into two shared first convolution layers, and a convolution layer result is obtained. The convolution layer result is input into the first convolution layer for the surface division, and the feature map of surface division having the w*h*c1 size is obtained. As the eutrophic water bodies has a great correlation with the black odor polluted water bodies, the convolution layer result needs to be input into the first convolution layer for the eutrophic water bodies and the black odor polluted water bodies, the feature map of eutrophic water bodies having a w*h*c2 size is obtained, and the feature map of black odor polluted water bodies having a w*h*c3 size is obtained.

The feature map of surface division having the w*h*c1 size is input into a third convolution layer, a feature map of surface division with eight channels is obtained, and the surface division detection result is obtained by the argmax function. In one embodiment, a maximum eigenvalue of eight eigenvalues at each position is obtained by the argmax function, and a channel identity corresponding to the maximum eigenvalue is used as the surface division detection result. Each of eight channels has a corresponding channel identity. Each of channel identities corresponds to a surface type. For example, a channel identity "0" represents mountain, a channel identity "1" represents water, a channel identity"2" represents forest, a channel identity "3" represents field, a channel identity"4" represents grass, a channel identity "5" represents city, a channel identity"6" represents wasteland, and a channel identity "7" represents others. In one embodiment, mountain can be represented by red, water can be represented by blue, forest can be represented by green, field can be represented by yellow, grass can be represented by orange, city can be represented by purple, wasteland can be represented by white, and others can be represented by black, for example.

The feature map of surface division and the feature map of eutrophic water bodies are serially connected in the channel dimension, and a feature map having a w*h*(c1+c2) size is obtained. A feature map with two channels is obtained by using the second convolution layer, and the eutrophic water bodies detection result is obtained by the argmax function. In one embodiment, a maximum eigenvalue between two eigenvalues at each position is obtained by the argmax function, and a channel identity corresponding to the maximum eigenvalue is used as the eutrophic water bodies detection result. Each of two channels has a corresponding channel identity. Each of channel identities corresponds to an eutrophic water bodies type. For example, a channel identity "0" represents eutrophic water bodies, which can be represented by blue, a channel identity "1" represents non-eutrophic water bodies, which can be represented by white.

The feature map of surface division and the feature map of black odor polluted water bodies are serially connected in the channel dimension, and a feature map having a w*h* (c1+c3) size is obtained. A feature map with two channels is obtained by using the second convolution layer, and the black odor polluted water bodies detection result is obtained by the argmax function. In one embodiment, a maximum eigenvalue between two eigenvalues at each position is obtained by the argmax function, and a channel identity corresponding to the maximum eigenvalue is used as the black odor polluted water bodies detection result. Each of two channels has a corresponding channel identity. Each of channel identities corresponds to a black odor polluted water bodies type. For example, a channel identity "0" represents black odor polluted water bodies, which can be represented by blue, a channel identity "1" represents non-black odor polluted water bodies, which can be represented by white.

The network architecture of the environmental monitoring model fully combines the correlation among the surface division, the eutrophic water bodies and the black odor polluted water bodies. According to the feature map of surface division and the feature map of eutrophic water bodies, the eutrophic water bodies detection result is obtained. According to the feature map of surface division and the feature map of black odor polluted water bodies, the black odor polluted water bodies detection result is obtained. The accuracy of detection of the eutrophic water bodies and the black odor polluted water bodies is improved. Calculation and size of the environmental monitoring model are reduced by sharing parameters of the semantic segmentation network and the first convolutional layer, and redundancy of time and space is avoided.

In one embodiment, the above-mentioned network framework is a diagram, and the network architecture of the present disclosure is not limited to the above environment monitoring of three dimensions (e.g., surface division, eutrophic water bodies, and black odor polluted water bodies), and the network architecture can include environment monitoring of other dimension, such as soil pollution.

In one embodiment, after the electronic device divides the satellite image into a plurality of first divided images, the electronic device further obtains a plurality of adjusted images by adjusting an image size of each of the plurality of first divided images. Each of the adjusted images may have a different size.

In one embodiment, the electronic device obtaining the first multi-dimensional feature map by inputting the plurality of first divided images into an environment monitoring model, includes: inputting the plurality of adjusted images into the environment monitoring model, and obtaining a feature map of each of the plurality of adjusted images. The electronic device further obtains the first multi-dimensional feature map by combining the feature map of the plurality of adjusted images.

In this embodiment, in order to make detection results more accurate, the image size of each of the plurality of first divided images needs to be adjusted. Specifically, each of the plurality of first divided images needs to be scaled, and the plurality of adjusted images are obtained. Each of the plurality of adjusted images has a different size, for example, an adjusted image has a w*h size, an adjusted image has a 1.2 w*1.2 h size, and an adjusted image has a 0.8 w*0.8 h size. The w*h size is a preset size.

The plurality of adjusted images are input into the environment monitoring model, and the feature map of each of the plurality of adjusted images is obtained. There are a plurality of dimensions for the feature map of each of the adjusted images, such as the surface division dimension, the eutrophic water bodies dimension, the black odor polluted water bodies dimension, and the like. Since the plurality of adjustment images are obtained for each of the first divided images, the feature maps of the plurality of adjusted images need to be combined in each of dimensions, and the combined feature map of a plurality of dimensions is used as the first multi-dimensional feature map.

In one embodiment, the electronic device obtaining the first multi-dimensional feature map by combining the feature map of the plurality of adjusted images, includes: adjusting an image size of the feature map of each of the plurality of adjusted images to a preset size; averaging a pixel value of the plurality of adjusted images at the same position according to the adjusted feature maps, and obtaining a pixel value of the corresponding positions of the first divided images; combining pixel values of all positions of the first divided images, and obtaining the first multi-dimensional feature map.

In this embodiment, after the feature map of each of the plurality of adjusted images is obtained, the image size of the feature map of each of the plurality of adjusted images needs to be adjusted to the preset size. Then, an average pixel value is obtained by averaging a pixel value of the plurality of adjusted images at the same position (e.g., row A and column A) according to the adjusted feature maps, and the average pixel value is used as a pixel value of a corresponding position of the first divided image (e.g., row A and column A). Finally, pixel values of all positions of the first divided image can be combined in each dimension, and the first multi-dimensional feature map is obtained.

In one embodiment, before the electronic device obtains a satellite image, the electronic device further obtains a plurality of training images and a plurality of label images that represent environment types of the plurality of training images.

The electronic device further obtains a training image set and a verification image set by processing the plurality of training images, obtains training label images and verification label images by processing the plurality of label images, and obtains a monitoring result by inputting the training image set into an initial model framework.

The electronic device further calculates a total environmental loss according to the monitoring result and the training label images, obtains a to-be-verified model by adjusting parameters of association network in the initial model framework to minimize the total environmental loss, and verifies the to-be-verified model by using the verification image set and the verification label images.

In response that a probability of passing the verification is within a preset range, the electronic device determines the to-be-verified model as the environment monitoring model.

In this embodiment, the training images can be satellite images in four wave bands (e.g., RGB and NIR) from a plurality of counties in different regions. The environment types can include a type of the surface division, a type of the eutrophic water bodies type and a type of the black odor polluted water bodies, for example. Each of the training label images is corresponding to a training image of the training image set, and each of the verification label images is corresponding to a verification image of the verification image set.

In one embodiment, parameters of the semantic segmentation network can be preset. In a training phase, parameters of the associated network need to be trained. Specifically, parameters of association network in an initial model framework need to be adjusted continuously until a total environmental loss is minimized according to Adam's algorithm, and the to-be-verified model is obtained. Finally the to-be-verified model is verified by using the verification image set and the verification label images, and the environment monitoring model is obtained.

In one embodiment, the electronic device obtaining a training image set and a verification image set by processing the plurality of training images, includes: dividing each of the plurality of training images into a plurality of second divided images; performing sample expansion processing on each of the plurality of second divided images, and obtaining a plurality of first extended images; selecting the training image set and the verification image set from the plurality of first extended images according to a preset ratio.

In one embodiment, the electronic device obtaining training label images and verification label images by processing the plurality of label images, includes: dividing each of the plurality of label images into a plurality of third divided images; performing sample expansion processing on each of the plurality of third divided images, and obtaining a plurality of second extended images; selecting the training label images and the verification label images from the plurality of second extended images according to the preset ratio.

Figure 3:
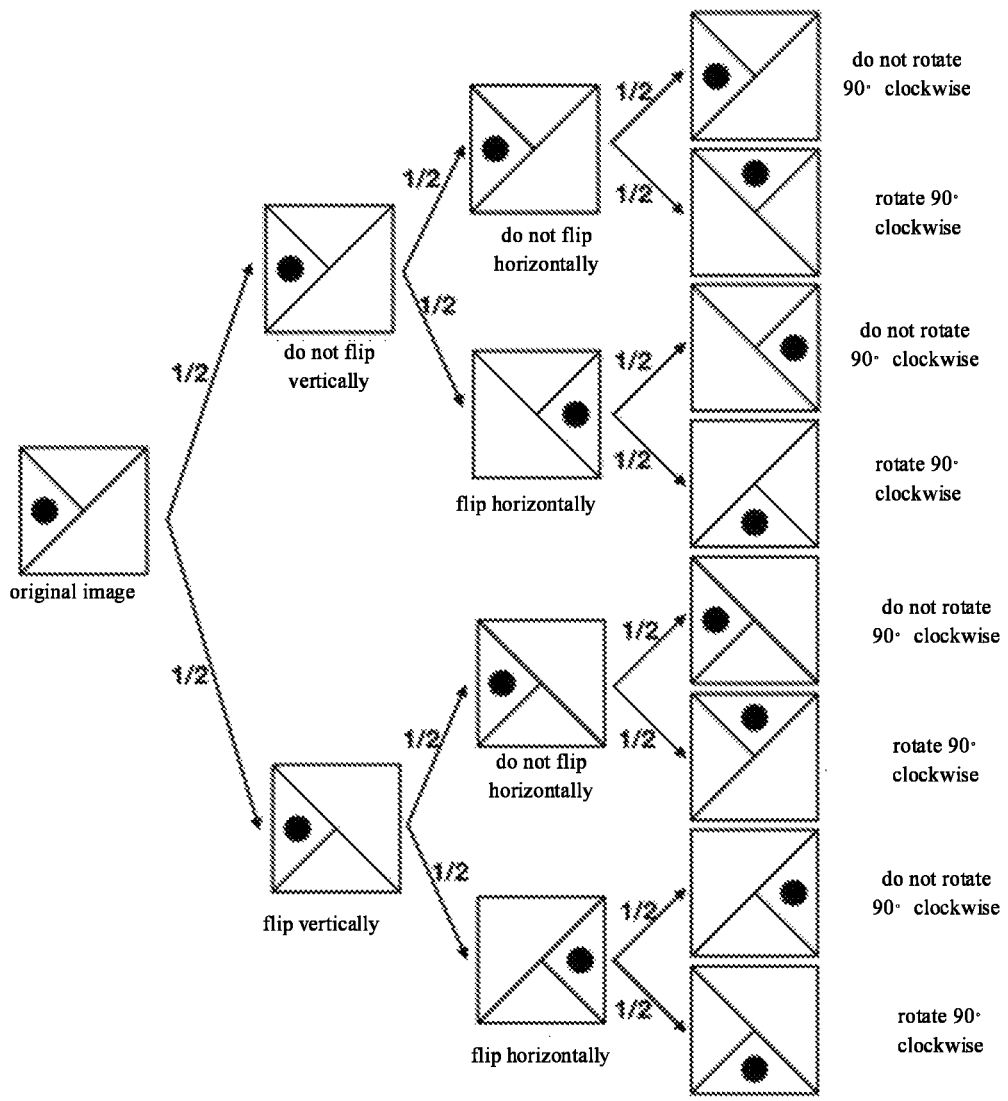
FIG. 3 is a diagram of one embodiment of an image expansion sample.

In this embodiment, each of the plurality of training images is divided into a plurality of square areas (e.g., the second divided images) with the same size, and each of the plurality of label images is divided into a plurality of square areas (e.g., the third divided images) having the same size, according to the preset area size. In addition, in order to prevent the model from overfitting, it is needed to expand samples. Therefore, the plurality of square areas need to be expanded. Specifically, each of the square areas can be flipped vertically with a probability of 1/2, and each of the square areas can be flipped horizontally with a probability of 1/2, and each of the square areas can be rotated 90° clockwise with a probability of 1/2, which may be show in FIG. 3, FIG. 3 is a diagram of one embodiment of an image expansion sample.

And different degrees of saturation, hue and brightness are adjusted, and a plurality of extended images (e.g., the first extended images and the second extended images) are obtained. Finally the training image set and the verification image set are selected from the plurality of first extended images, the training label images and the verification label images are selected from the plurality of second extended images according to the preset ratio (e.g., 85:15).

Through experimental verification, an accuracy of the environmental monitoring model for the surface division is 0.88, a recall rate of the environmental monitoring model for the eutrophic water bodies is 0.83, and a recall rate of the environmental monitoring model for the black odor polluted water bodies is 0.76.

In block 14, the electronic device obtains a plurality of environmental feature values of the overlapping areas from the first multi-dimensional feature map, and updates the first multi-dimensional feature map according to the plurality of environmental feature values.

In one embodiment, an average feature value of the overlapping area can be calculated according to the plurality of environmental feature values, and the average feature value can be used as a feature value of the overlapping area to update the first multi-dimensional feature map.

For example, assuming that four adjacent first divided images have the same overlapping area, and the feature values of the overlapping areas are 0.1, 0.2, 0.3, and 0.6, and the average feature value of the overlapping areas is calculated as (0.1+0.2+0.3+0.6)/4=0.3, then the feature value of the four adjacent first divided images in the overlapping area can be updated to 0.3, and the feature values of the other areas remain unchanged.

In block 15, the electronic device obtains a second multi-dimensional feature map by stitching the updated first multi-dimensional feature map on the overlapping area.

Since the updated feature values of each two adjacent first divided images in the overlapping area are the same, the updated first multi-dimensional feature map can be stitched on the overlap area, and the second multi-dimensional feature map is obtained. The second multi-dimensional feature map is a multi-dimensional feature map of the satellite image. The second multi-dimensional feature map includes a plurality of feature maps of different dimensions, such as a feature map of surface division, a feature map of eutrophic water bodies, and a feature map of black odor polluted water bodies.

In block 16, the electronic device determines a multi-dimensional environmental detection result of the satellite image according to the second multi-dimensional feature map.

The multi-dimensional environment detection result includes a surface division detection result, an eutrophic water bodies detection result and a black odor polluted water bodies detection result.

In each of the dimensions, a maximum eigenvalue among a plurality of feature values at each position is obtained by the argmax function, and a channel identity corresponding to the maximum eigenvalue is used as the surface division detection result in the position. For example, in the dimension of the surface division, the channel identity corresponding to the maximum eigenvalue of position A is 0, and a type of the surface division represented by 0 is mountain, the position A can represent the mountain in red on the surface division detection result.

In the present disclosure, the satellite image has a large coverage area, and an environment monitoring with large area can be realized. By dividing the satellite image into a plurality of first divided images with overlapping areas, subsequent stitching can be made smoother. The environmental monitoring model fully combines the correlation between the environmental information of different dimensions, the environmental features of a plurality of different dimensions are correlated through the association network, and accuracy of environmental detection is improved.

Figure 4:
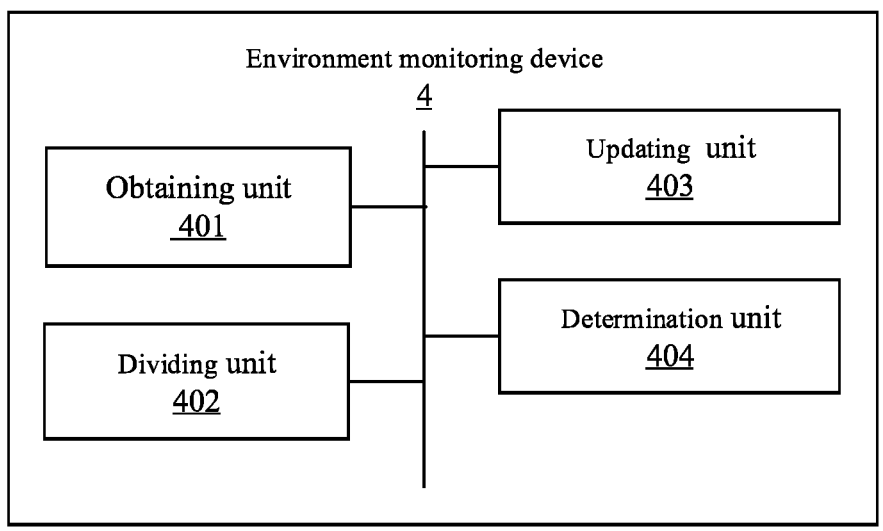
FIG. 4 is a block diagram of one embodiment of an environment monitoring device.

FIG. 4 is a block diagram of one embodiment of an environment monitoring device.

In some embodiments, the environment monitoring device 4 can be run in an electronic device. The environment monitoring device 4 may include a plurality of functional modules, which includes program code segments. Program codes of each of the program code segments in the environment monitoring device 4 may be stored in a memory and executed by at least one processor to perform (as described in detail in FIG. 1) environment monitoring.

In one embodiment, the environment monitoring device 4 includes a plurality of functional modules according to functions performed thereby. The functional modules may include an obtaining module 401, a dividing module 402, an updating module 403 and a determination module 404. A module as referred to in the present disclosure refers to a series of computer program code segments, which are stored in a memory and can be executed by at least one processor, and are capable of performing corresponding functions. In this embodiment, the functions of each module are described detailly.

The obtaining module 401 obtains a satellite image.

In one embodiment, the obtaining module 401 can obtain the satellite image from other device, which can acquire the satellite image from one satellite.

The satellite image may be an environmental image of any region that needs to be monitored. Wave bands of the satellite image band may include at least four wave bands, such as red, green, blue (RGB) and near infrared (NIR).

The dividing module 402 divides the satellite image into a plurality of first divided images, wherein each two adjacent images of the plurality of first divided images are overlapped to define overlapping areas.

In one embodiment, the satellite image can be divided into square areas having a same size according to a preset area size, and each of the square areas is denoted as the first divided image.

In order to make image stitching smoother, when the satellite image is divided, it is needed to ensure that each two adjacent images of the plurality of first divided images are overlapped to define overlapping areas, and an image content of the overlapping areas is the same. A size of the overlapping areas can be set as required, such as one overlapping area is a half of a total area of a first divided image.

The obtaining module 401 further obtains a first multi-dimensional feature map by inputting the plurality of first divided images into an environment monitoring model.

In one embodiment, the environment monitoring model includes a semantic segmentation network and an association network, the association network being adapted for associating a plurality of dimensional environmental features.

The association network includes a plurality of first convolution layers where environmental features of different dimensions are extracted, and a plurality of second convolution layers that the environmental features of different dimensions are associated.

The first multi-dimensional feature map is a feature map of a plurality of different dimensions, such as a feature map of surface division, a feature map of eutrophic water bodies, and a feature map of black odor polluted water bodies.

FIG. 2 is a diagram of one embodiment of a network architecture of an environmental monitoring model.

As shown in FIG. 2, the environment monitoring model includes the semantic segmentation network and the association network. For example, the semantic segmentation network is U-Net or DeepLabV3+.

A plurality of first divided images are input into the semantic segmentation network, and feature maps having a w*h*c size are obtained. W represents a length of the feature maps, h represents a width of the feature maps, and c represents a number of channels of the feature maps. Then, the feature maps are input into two shared first convolution layers, and a convolution layer result is obtained. The convolution layer result is input into the first convolution layer for the surface division, and the feature map of surface division having the w*h*c1 size is obtained. As the eutrophic water bodies has a great correlation with the black odor polluted water bodies, the convolution layer result needs to be input into the first convolution layer for the eutrophic water bodies and the black odor polluted water bodies, the feature map of eutrophic water bodies having a w*h*c2 size is obtained, and the feature map of black odor polluted water bodies having a w*h*c3 size is obtained.

The feature map of surface division having the w*h*c1 size is input into a third convolution layer, a feature map of surface division with eight channels is obtained, and the surface division detection result is obtained by the argmax function. In one embodiment, a maximum eigenvalue of eight eigenvalues at each position is obtained by the argmax function, and a channel identity corresponding to the maximum eigenvalue is used as the surface division detection result. Each of eight channels has a corresponding channel identity. Each of channel identities corresponds to a surface type, For example, a channel identity "0" represents mountain, a channel identity "1" represents water, a channel identity"2" represents forest, a channel identity "3" represents field, a channel identity"4" represents grass, a channel identity "5" represents city, a channel identity"6" represents wasteland, and a channel identity "7" represents others. In one embodiment, mountain can be represented by red, water can be represented by blue, forest can be represented by green, field can be represented by yellow, grass can be represented by orange, city can be represented by purple, wasteland can be represented by white, and others can be represented by black, for example.

The feature map of surface division and the feature map of eutrophic water bodies are serially connected in the channel dimension, and a feature map having a w*h*(c1+c2) size is obtained. A feature map with two channels is obtained by using the second convolution layer, and the eutrophic water bodies detection result is obtained by the argmax function. In one embodiment, a maximum eigenvalue between two eigenvalues at each position is obtained by the argmax function, and a channel identity corresponding to the maximum eigenvalue is used as the eutrophic water bodies detection result. Each of two channels has a corresponding channel identity. Each of channel identities corresponds to an eutrophic water bodies type. For example, a channel identity "0" represents eutrophic water bodies, which can be represented by blue, a channel identity "1" represents non-eutrophic water bodies, which can be represented by white.

The feature map of surface division and the feature map of black odor polluted water bodies are serially connected in the channel dimension, and a feature map having a w*h*(c1+c3) size is obtained. A feature map with two channels is obtained by using the second convolution layer, and the black odor polluted water bodies detection result is obtained by the argmax function. In one embodiment, a maximum eigenvalue between two eigenvalues at each position is obtained by the argmax function, and a channel identity corresponding to the maximum eigenvalue is used as the black odor polluted water bodies detection result. Each of two channels has a corresponding channel identity. Each of channel identities corresponds to a black odor polluted water bodies type. For example, a channel identity "0" represents black odor polluted water bodies, which can be represented by blue, a channel identity "1" represents non-black odor polluted water bodies, which can be represented by white.

The network architecture of the environmental monitoring model fully combines the correlation among the surface division, the eutrophic water bodies and the black odor polluted water bodies. According to the feature map of surface division and the feature map of eutrophic water bodies, the eutrophic water bodies detection result is obtained. According to the feature map of surface division and the feature map of black odor polluted water bodies, the black odor polluted water bodies detection result is obtained. The accuracy of detection of the eutrophic water bodies and the black odor polluted water bodies is improved. Calculation and size of the environmental monitoring model are reduced by sharing parameters of the semantic segmentation network and the first convolutional layer, and redundancy of time and space is avoided.

In one embodiment, the above-mentioned network framework is a diagram, and the network architecture of the present disclosure is not limited to the above environment monitoring of three dimensions (e.g., surface division, eutrophic water bodies, and black odor polluted water bodies), and the network architecture can include environment monitoring of other dimension, such as soil pollution.

In one embodiment, after the electronic device divides the satellite image into a plurality of first divided images, the electronic device further obtains a plurality of adjusted images by adjusting an image size of each of the plurality of first divided images. Each of the adjusted images may have a different size.

In one embodiment, The obtaining module 401 obtaining the first multi-dimensional feature map by inputting the plurality of first divided images into an environment monitoring model, includes: inputting the plurality of adjusted images into the environment monitoring model, and obtaining a feature map of each of the plurality of adjusted images. The obtaining module 401 further obtains the first multi-dimensional feature map by combining the feature map of the plurality of adjusted images.

In this embodiment, in order to make detection results more accurate, the image size of each of the plurality of first divided images needs to be adjusted. Specifically, each of the plurality of first divided images needs to be scaled, and the plurality of adjusted images are obtained. Each of the plurality of adjusted images has a different size, for example, an adjusted image has a w*h size, an adjusted image has a 1.2 w*1.2 h size, and an adjusted image has a 0.8 w*0.8 h size. The w*h size is a preset size.

The plurality of adjusted images are input into the environment monitoring model, and the feature map of each of the plurality of adjusted images is obtained. There are a plurality of dimensions for the feature map of each of the adjusted images, such as the surface division dimension, the eutrophic water bodies dimension, the black odor polluted water bodies dimension, and the like. Since the plurality of adjustment images are obtained for each of the first divided images, the feature maps of the plurality of adjusted images need to be combined in each of dimensions, and the combined feature map of a plurality of dimensions is used as the first multi-dimensional feature map.

In one embodiment, the obtaining module 401 obtaining the first multi-dimensional feature map by combining the feature map of the plurality of adjusted images, includes: adjusting an image size of the feature map of each of the plurality of adjusted images to a preset size; averaging a pixel value of the plurality of adjusted images at the same position according to the adjusted feature maps, and obtaining a pixel value of the corresponding positions of the first divided images; combining pixel values of all positions of the first divided images, and obtaining the first multi-dimensional feature map.

In this embodiment, after the feature map of each of the plurality of adjusted images is obtained, the image size of the feature map of each of the plurality of adjusted images needs to be adjusted to the preset size. Then, an average pixel value is obtained by averaging a pixel value of the plurality of adjusted images at the same position (e.g., row A and column A) according to the adjusted feature maps, and the average pixel value is used as a pixel value of a corresponding position of the first divided image (e.g., row A and column A). Finally, pixel values of all positions of the first divided image can be combined in each dimension, and the first multi-dimensional feature map is obtained.

In one embodiment, before obtaining a satellite image, the obtaining module 401 further obtains a plurality of training images and a plurality of label images that represent environment types of the plurality of training images.

The obtaining module 401 further obtains a training image set and a verification image set by processing the plurality of training images, obtains training label images and verification label images by processing the plurality of label images, and obtains a monitoring result by inputting the training image set into an initial model framework.

In one embodiment, the environment monitoring device 4 further includes a calculation module, a verification module.

The calculation module calculates a total environmental loss according to the monitoring result and the training label images.

The obtaining module 401 further obtains a to-be-verified model by adjusting parameters of association network in the initial model framework to minimize the total environmental loss.

The verification module verifies the to-be-verified model by using the verification image set and the verification label images.

In response that a probability of passing the verification is within a preset range, the determination module 404 determines the to-be-verified model as the environment monitoring model.

In this embodiment, the training images can be satellite images in four wave bands (e.g., RGB and NIR) from a plurality of counties in different regions. The environment types can include a type of the surface division, a type of the eutrophic water bodies type and a type of the black odor polluted water bodies, for example. Each of the training label images is corresponding to a training image of the training image set, and each of the verification label images is corresponding to a verification image of the verification image set.

In one embodiment, parameters of the semantic segmentation network can be preset. In a training phase, parameters of the associated network need to be trained. Specifically, parameters of association network in an initial model framework need to be adjusted continuously until a total environmental loss is minimized according to Adam's algorithm, and the to-be-verified model is obtained. Finally the to-be-verified model is verified by using the verification image set and the verification label images, and the environment monitoring model is obtained.

In one embodiment, the obtaining module 401 obtaining a training image set and a verification image set by processing the plurality of training images, includes: dividing each of the plurality of training images into a plurality of second divided images; performing sample expansion processing on each of the plurality of second divided images, and obtaining a plurality of first extended images; selecting the training image set and the verification image set from the plurality of first extended images according to a preset ratio.

In one embodiment, the obtaining module 401 obtaining training label images and verification label images by processing the plurality of label images, includes: dividing each of the plurality of label images into a plurality of third divided images; performing sample expansion processing on each of the plurality of third divided images, and obtaining a plurality of second extended images; selecting the training label images and the verification label images from the plurality of second extended images according to the preset ratio.

In this embodiment, each of the plurality of training images is divided into a plurality of square areas (e.g., the second divided images) with the same size, and each of the plurality of label images is divided into a plurality of square areas (e.g., the third divided images) having the same size, according to the preset area size. In addition, in order to prevent the model from overfitting, it is needed to expand samples. Therefore, the plurality of square areas need to be expanded. Specifically, each of the square areas can be flipped vertically with a probability of 1/2, and each of the square areas can be flipped horizontally with a probability of 1/2, and each of the square areas can be rotated 90° clockwise with a probability of 1/2, which may be show in FIG. 3, FIG. 3 is a diagram of one embodiment of an image expansion sample.

And different degrees of saturation, hue and brightness are adjusted, and a plurality of extended images (e.g., the first extended images and the second extended images) are obtained. Finally the training image set and the verification image set are selected from the plurality of first extended images, the training label images and the verification label images are selected from the plurality of second extended images according to the preset ratio (e.g., 85:15).

Through experimental verification, an accuracy of the environmental monitoring model for the surface division is 0.88, a recall rate of the environmental monitoring model for the eutrophic water bodies is 0.83, and a recall rate of the environmental monitoring model for the black odor polluted water bodies is 0.76.

The obtaining module 401 further obtains a plurality of environmental feature values of the overlapping areas from the first multi-dimensional feature map.

The updating module 403 updates the first multi-dimensional feature map according to the plurality of environmental feature values.

In one embodiment, an average feature value of the overlapping area can be calculated according to the plurality of environmental feature values, and the average feature value can be used as a feature value of the overlapping area to update the first multi-dimensional feature map.

For example, assuming that four adjacent first divided images have the same overlapping area, and the feature values of the overlapping areas are 0.1, 0.2, 0.3, and 0.6, and the average feature value of the overlapping areas is calculated as (0.1+0.2+0.3+0.6)/4=0.3, then the feature value of the four adjacent first divided images in the overlapping area can be updated to 0.3, and the feature values of the other areas remain unchanged.

The obtaining module 401 further obtains a second multi-dimensional feature map by stitching the updated first multi-dimensional feature map on the overlapping area.

Since the updated feature values of each two adjacent first divided images in the overlapping area are the same, the updated first multi-dimensional feature map can be stitched on the overlap area, and the second multi-dimensional feature map is obtained. The second multi-dimensional feature map is a multi-dimensional feature map of the satellite image. The second multi-dimensional feature map includes a plurality of feature maps of different dimensions, such as a feature map of surface division, a feature map of eutrophic water bodies, and a feature map of black odor polluted water bodies.

The determination module 404 determines a multi-dimensional environmental detection result of the satellite image according to the second multi-dimensional feature map.

The multi-dimensional environment detection result includes a surface division detection result, an eutrophic water bodies detection result and a black odor polluted water bodies detection result.

In each of the dimensions, a maximum eigenvalue among a plurality of feature values at each position is obtained by the argmax function, and a channel identity corresponding to the maximum eigenvalue is used as the surface division detection result in the position. For example, in the dimension of the surface division, the channel identity corresponding to the maximum eigenvalue of position A is 0, and a type of the surface division represented by 0 is mountain, the position A can represent the mountain in red on the surface division detection result.

In the present disclosure, the satellite image has a large coverage area, and an environment monitoring with large area can be realized. By dividing the satellite image into a plurality of first divided images with overlapping areas, subsequent stitching can be made smoother. The environmental monitoring model fully combines the correlation between the environmental information of different dimensions, the environmental features of a plurality of different dimensions are correlated through the association network, and accuracy of environmental detection is improved.

Figure 5:
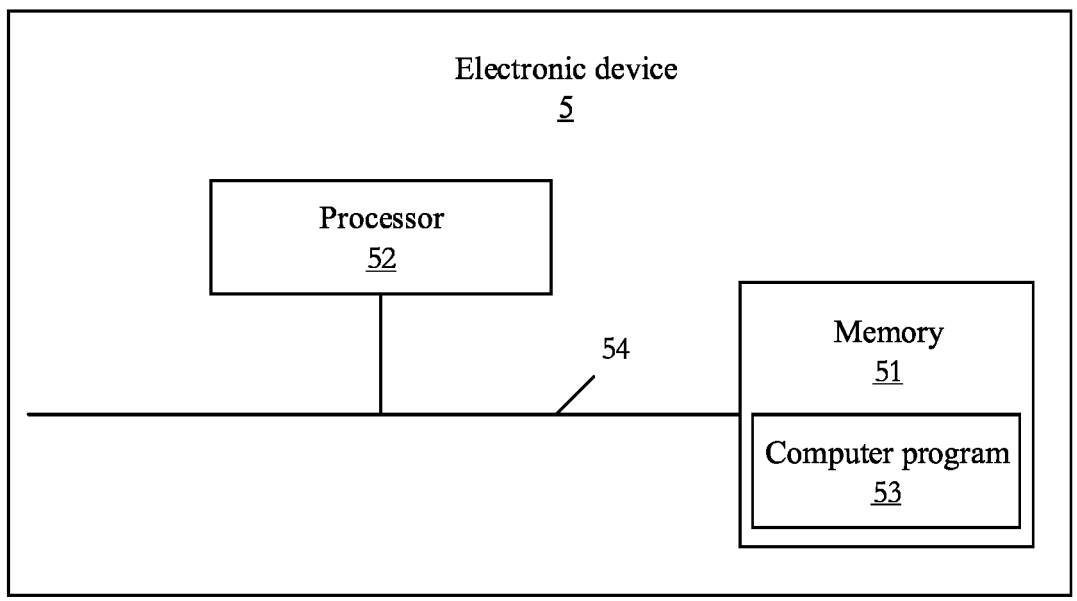
FIG. 5 is a block diagram of one embodiment of an electronic device that performs the environment monitoring method of FIG. 1.

FIG. 5 is a block diagram of one embodiment of an electronic device.

An electronic device 5 includes a memory 51, at least one processor 52, a computer program 53 stored in the memory 51 and invoked by the at least one processor 52, and at least one communication bus 54.

In other embodiments, the electronic device 5 may include more or less components than those illustrated, or may combine certain components, or have different components. The electronic device 5 may also include input and output devices, network access devices, and the like.

The at least one processor 52 may be a central processing unit (CPU), or may be another general-purpose processor, a digital signal processor (DSP), or an application specific integrated circuit (ASIC), a Field-Programmable Gate Array (FPGA) or other programmable logic device, discrete gate or transistor logic device, discrete hardware components, and the like. The processor 52 may be a microprocessor or the processor 52 may be any conventional processor or the like. The processor 52 is a control center of the electronic device 5, and connects various parts of the entire electronic device 5 by using various interfaces and lines.

The memory 51 can store the computer program 53 and/or modules/units by running or executing computer programs. The data stored in the memory 51 may be invoked to implement various functions of the electronic device 5. The memory 51 may mainly include a storage program area and a storage data area. The storage program area may store an operating system, an application required for at least one function (such as a video playing function, etc.), and the like. Data entered by the user of the electronic device 5 is also stored. In addition, the memory 51 may include a non-transitory memory such as a hard disk, a memory, a plug-in hard disk, a smart memory card (SMC), and a secure digital (SD) card, flash card, at least one disk storage device, flash device, or other non-volatile solid state storage device.

Combined with FIG. 1, the memory 51 in the electronic device 5 stores a plurality of instructions to implement an environment monitoring method, and when the plurality of instructions are executed by the processor 52, the processor 52 is caused to obtain a satellite image; divide the satellite image into a plurality of first divided images, wherein each two adjacent images of the plurality of first divided images are overlapped to define overlapping areas; obtain a first multi-dimensional feature map by inputting the plurality of first divided images into an environment monitoring model, the environment monitoring model comprising a semantic segmentation network and an association network, the association network being adapted for associating a plurality of dimensional environmental features; obtain a plurality of environmental feature values of the overlapping areas from the first multi-dimensional feature map; update the first multi-dimensional feature map according to the plurality of environmental feature values; obtain a second multi-dimensional feature map by stitching the updated first multi-dimensional feature map on the overlapping area; determine a multi-dimensional environmental detection result of the satellite image according to the second multi-dimensional feature map.

In at least one embodiment, the association network includes a plurality of first convolution layers where environmental features of different dimensions are extracted, and a plurality of second convolution layers that the environmental features of different dimensions are associated.

In at least one embodiment, after the at least one processor to dividing divide the satellite image into a plurality of first divided images, the at least one processor further to obtain a plurality of adjusted images by adjusting an image size of each of the plurality of first divided images, each of the plurality of adjusted images having a different size.

The at least one processor to obtain a first multi-dimensional feature map by inputting the plurality of first divided images into an environment monitoring model, includes: input the plurality of adjusted images into the environment monitoring model, and obtain a feature map of each of the plurality of adjusted images; obtain the first multi-dimensional feature map by combining the feature map of the plurality of adjusted images.

In at least one embodiment, the at least one processor to obtain the first multi-dimensional feature map by combining the feature map of the plurality of adjusted images, includes: adjust an image size of the feature map of each of the plurality of adjusted images to a preset size; average a pixel value of the plurality of adjusted images at the same position according to the adjusted feature maps, and obtain a pixel value of the corresponding positions of the first divided images; combine pixel values of all positions of the first divided images, and obtain the first multi-dimensional feature map.

In at least one embodiment, the at least one processor further to obtain a plurality of training images and a plurality of label images that represent environment types of the plurality of training images; obtain a training image set and a verification image set by processing the plurality of training images; obtain training label images and verification label images by processing the plurality of label images; obtain a monitoring result by inputting the training image set into an initial model framework; calculate a total environmental loss according to the monitoring result and the training label images; obtain a to-be-verified model by adjusting parameters of association network in the initial model framework to minimize the total environmental loss; verify the to-be-verified model by using the verification image set and the verification label images; in response that a probability of passing the verification is within a preset range, determine the to-be-verified model as the environment monitoring model.

In at least one embodiment, the at least one processor to obtain a training image set and a verification image set by processing the plurality of training images, includes: divide each of the plurality of training images into a plurality of second divided images; perform sample expansion processing on each of the plurality of second divided images, and obtain a plurality of first extended images; select the training image set and the verification image set from the plurality of first extended images according to a preset ratio.

In at least one embodiment, the at least one processor to obtain training label images and verification label images by processing the plurality of label images, includes: divide each of the plurality of label images into a plurality of third divided images; perform sample expansion processing on each of the plurality of third divided images, and obtain a plurality of second extended images; select the training label images and the verification label images from the plurality of second extended images according to the preset ratio.

In at least one embodiment, the multi-dimensional environment detection result comprises a surface division detection result, an eutrophic water bodies detection result and a black odor polluted water bodies detection result.

For details, refer to the description of the related steps in the corresponding embodiment of FIG. 1 for the specific implementation of the above-mentioned instructions by the processor 52 is previously given.

In the present disclosure, the satellite image has a large coverage area, and an environment monitoring with large area can be realized. By dividing the satellite image into a plurality of first divided images with overlapping areas, subsequent stitching can be made smoother. The environmental monitoring model fully combines the correlation between the environmental information of different dimensions, the environmental features of a plurality of different dimensions are correlated through the association network, and accuracy of environmental detection is improved.

The modules/units integrated by the electronic device 5, if implemented in the form of software functional units as separate products, may be stored in a computer readable storage medium. Based on such understanding, the present disclosure implements all or part of the processes in the foregoing embodiments, and may also be completed by a computer program to instruct related hardware. The computer program may be stored in a computer readable storage medium. The steps of the various method embodiments described above may be implemented when the program is executed by the processor. Wherein, the computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, and a read-only memory (ROM).

In the several embodiments provided by the present disclosure, it should be understood that the disclosed system, apparatus, and method may be implemented in other manners. For example, the device embodiments described above are merely illustrative. For example, the division of the modules is only a logical function division, and the actual implementation may have another manner of division.

The modules described as separate components may or may not be physically separated, and the components displayed as modules may or may not be physical units, that is, may be located in one place, or may be distributed in multiple network units. Some or all of the modules may be selected according to actual needs to achieve the purpose of the disclosure.

In addition, each functional module in each embodiment of the present disclosure may be integrated into one processing unit, or each unit may exist as a standalone unit, or two or more units may be integrated into one unit. The above integrated unit can be implemented in the form of hardware or in the form of hardware plus software function modules.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims instead all changes in the meaning and scope of equivalent elements are included in the present disclosure. Any accompanying drawings in the claims should not be construed as limiting the claim. In addition, it is to be understood that the word "including" does not exclude other elements or steps. A plurality of units or devices recited in the system claims can also be implemented by software or hardware. The particular ordering of words does not denote any particular order.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An environment monitoring method comprising:
   obtaining a satellite image;
   dividing the satellite image into a plurality of first divided images, wherein each two adjacent images of the plurality of first divided images are overlapped to define overlapping areas;
   obtaining a first multi-dimensional feature map by inputting the plurality of first divided images into an environment monitoring model, the environment monitoring model comprising a semantic segmentation network and an association network, the association network being adapted for associating a plurality of dimensional environmental features;
   obtaining a plurality of environmental feature values of the overlapping areas from the first multi-dimensional feature map;
   updating the first multi-dimensional feature map according to the plurality of environmental feature values;
   obtaining a second multi-dimensional feature map by stitching the updated first multi-dimensional feature map on the overlapping area;
   determining a multi-dimensional environmental detection result of the satellite image according to the second multi-dimensional feature map.

2. The environment monitoring method of claim 1, wherein the association network comprises a plurality of first convolution layers where environmental features of different dimensions are extracted, and a plurality of second convolution layers that the environmental features of different dimensions are associated.

3. The environment monitoring method of claim 1, after dividing the satellite image into the plurality of first divided images, the environment monitoring method further comprising:
   obtaining a plurality of adjusted images by adjusting an image size of each of the plurality of first divided images, each of the plurality of adjusted images having a different size;
   wherein a method of obtaining the first multi-dimensional feature map by inputting the plurality of first divided images into the environment monitoring model comprises:
   inputting the plurality of adjusted images into the environment monitoring model, and obtaining a feature map of each of the plurality of adjusted images;

obtaining the first multi-dimensional feature map by combining the feature map of the plurality of adjusted images.

4. The environment monitoring method of claim 3, wherein a method of obtaining the first multi-dimensional feature map by combining the feature map of the plurality of adjusted images comprises:
adjusting an image size of the feature map of each of the plurality of adjusted images to a preset size;
averaging a pixel value of the plurality of adjusted images at a same position according to the adjusted feature maps, and obtaining a pixel value of a corresponding positions of the first divided images;
combining pixel values of all positions of the first divided images, and obtaining the first multi-dimensional feature map.

5. The environment monitoring method of claim 1, further comprising:
obtaining a plurality of training images and a plurality of label images which represent environment types of the plurality of training images;
obtaining a training image set and a verification image set by processing the plurality of training images;
obtaining training label images and verification label images by processing the plurality of label images;
obtaining a monitoring result by inputting the training image set into an initial model framework;
calculating a total environmental loss according to the monitoring result and the training label images;
obtaining a to-be-verified model by adjusting parameters of association network in the initial model framework to minimize the total environmental loss;
verifying the to-be-verified model by using the verification image set and the verification label images;
in response that a probability of passing the verification is within a preset range, determining the to-be-verified model as the environment monitoring model.

6. The environment monitoring method of claim 5, wherein obtaining the training image set and the verification image set by processing the plurality of training images comprises:
dividing each of the plurality of training images into a plurality of second divided images;
performing sample expansion processing on each of the plurality of second divided images, and obtaining a plurality of first extended images;
selecting the training image set and the verification image set from the plurality of first extended images according to a preset ratio;
wherein obtaining training label images and verification label images by processing the plurality of label images comprises:
dividing each of the plurality of label images into a plurality of third divided images;
performing sample expansion processing on each of the plurality of third divided images, and obtaining a plurality of second extended images;
selecting the training label images and the verification label images from the plurality of second extended images according to the preset ratio.

7. The environment monitoring method of claim 1, wherein the multi-dimensional environment detection result comprises a surface division detection result, an eutrophic water bodies detection result and a black odor polluted water bodies detection result.

8. An electronic device, comprising:
at least one processor; and
a storage device storing one or more programs which when executed by the at least one processor, causes the at least one processor to:
obtain a satellite image;
divide the satellite image into a plurality of first divided images, wherein each two adjacent images of the plurality of first divided images are overlapped to define overlapping areas;
obtain a first multi-dimensional feature map by inputting the plurality of first divided images into an environment monitoring model, the environment monitoring model comprising a semantic segmentation network and an association network, the association network being adapted for associating a plurality of dimensional environmental features;
obtain a plurality of environmental feature values of the overlapping areas from the first multi-dimensional feature map;
update the first multi-dimensional feature map according to the plurality of environmental feature values;
obtain a second multi-dimensional feature map by stitching the updated first multi-dimensional feature map on the overlapping area;
determine a multi-dimensional environmental detection result of the satellite image according to the second multi-dimensional feature map.

9. The electronic device of claim 8, wherein the association network comprises a plurality of first convolution layers where environmental features of different dimensions are extracted, and a plurality of second convolution layers that the environmental features of different dimensions are associated.

10. The electronic device of claim 8, after the at least one processor to divide the satellite image into the plurality of first divided images, wherein the at least one processor further to:
obtain a plurality of adjusted images by adjusting an image size of each of the plurality of first divided images, each of the plurality of adjusted images having a different size;
wherein the at least one processor to obtain the first multi-dimensional feature map by inputting the plurality of first divided images into the environment monitoring model comprises:
input the plurality of adjusted images into the environment monitoring model, and obtain a feature map of each of the plurality of adjusted images;
obtain the first multi-dimensional feature map by combining the feature map of the plurality of adjusted images.

11. The electronic device of claim 10, wherein the at least one processor to obtain the first multi-dimensional feature map by combining the feature map of the plurality of adjusted images comprises:
adjust an image size of the feature map of each of the plurality of adjusted images to a preset size;
average a pixel value of the plurality of adjusted images at a same position according to the adjusted feature maps, and obtain a pixel value of a corresponding positions of the first divided images;
combine pixel values of all positions of the first divided images, and obtain the first multi-dimensional feature map.

12. The electronic device of claim 8, wherein the at least one processor further to:
- obtain a plurality of training images and a plurality of label images which represent environment types of the plurality of training images;
- obtain a training image set and a verification image set by processing the plurality of training images;
- obtain training label images and verification label images by processing the plurality of label images;
- obtain a monitoring result by inputting the training image set into an initial model framework;
- calculate a total environmental loss according to the monitoring result and the training label images;
- obtain a to-be-verified model by adjusting parameters of association network in the initial model framework to minimize the total environmental loss;
- verify the to-be-verified model by using the verification image set and the verification label images;
- in response that a probability of passing the verification is within a preset range, determine the to-be-verified model as the environment monitoring model.

13. The electronic device of claim 12, wherein the at least one processor to obtain the training image set and the verification image set by processing the plurality of training images comprises:
- divide each of the plurality of training images into a plurality of second divided images;
- perform sample expansion processing on each of the plurality of second divided images, and obtain a plurality of first extended images;
- select the training image set and the verification image set from the plurality of first extended images according to a preset ratio;
- wherein the at least one processor to obtain training label images and verification label images by processing the plurality of label images comprises:
  - divide each of the plurality of label images into a plurality of third divided images;
  - perform sample expansion processing on each of the plurality of third divided images, and obtain a plurality of second extended images;
  - select the training label images and the verification label images from the plurality of second extended images according to the preset ratio.

14. The electronic device of claim 8, wherein the multi-dimensional environment detection result comprises a surface division detection result, an eutrophic water bodies detection result and a black odor polluted water bodies detection result.

15. A non-transitory storage medium having stored thereon instructions that, when executed by a processor of an electronic device, causes the electronic device to perform an environment monitoring method, the method comprising:
- obtaining a satellite image;
- dividing the satellite image into a plurality of first divided images, wherein each two adjacent images of the plurality of first divided images are overlapped to define overlapping areas;
- obtaining a first multi-dimensional feature map by inputting the plurality of first divided images into an environment monitoring model, the environment monitoring model comprising a semantic segmentation network and an association network, the association network being adapted for associating a plurality of dimensional environmental features;
- obtaining a plurality of environmental feature values of the overlapping areas from the first multi-dimensional feature map;
- updating the first multi-dimensional feature map according to the plurality of environmental feature values;
- obtaining a second multi-dimensional feature map by stitching the updated first multi-dimensional feature map on the overlapping area;
- determining a multi-dimensional environmental detection result of the satellite image according to the second multi-dimensional feature map.

16. The non-transitory storage medium of claim 15, wherein the association network comprises a plurality of first convolution layers where environmental features of different dimensions are extracted, and a plurality of second convolution layers that the environmental features of different dimensions are associated.

17. The non-transitory storage medium of claim 15, after dividing the satellite image into the plurality of first divided images, the method further comprising:
- obtaining a plurality of adjusted images by adjusting an image size of each of the plurality of first divided images, each of the plurality of adjusted images having a different size;
- wherein obtaining the first multi-dimensional feature map by inputting the plurality of first divided images into the environment monitoring model comprises:
  - inputting the plurality of adjusted images into the environment monitoring model, and obtaining a feature map of each of the plurality of adjusted images;
  - obtaining the first multi-dimensional feature map by combining the feature map of the plurality of adjusted images.

18. The non-transitory storage medium of claim 17, wherein obtaining the first multi-dimensional feature map by combining the feature map of the plurality of adjusted images comprises:
- adjusting an image size of the feature map of each of the plurality of adjusted images to a preset size;
- averaging a pixel value of the plurality of adjusted images at a same position according to the adjusted feature maps, and obtaining a pixel value of a corresponding positions of the first divided images;
- combining pixel values of all positions of the first divided images, and obtaining the first multi-dimensional feature map.

19. The non-transitory storage medium of claim 15, the method further comprising:
- obtaining a plurality of training images and a plurality of label images that represent environment types of the plurality of training images;
- obtaining a training image set and a verification image set by processing the plurality of training images;
- obtaining training label images and verification label images by processing the plurality of label images;
- obtaining a monitoring result by inputting the training image set into an initial model framework;
- calculating a total environmental loss according to the monitoring result and the training label images;
- obtaining a to-be-verified model by adjusting parameters of association network in the initial model framework to minimize the total environmental loss;
- verifying the to-be-verified model by using the verification image set and the verification label images;
- in response that a probability of passing the verification is within a preset range, determining the to-be-verified model as the environment monitoring model.

20. The non-transitory storage medium of claim 19, wherein obtaining the training image set and the verification image set by processing the plurality of training images comprises:

dividing each of the plurality of training images into a plurality of second divided images;

performing sample expansion processing on each of the plurality of second divided images, and obtaining a plurality of first extended images;

selecting the training image set and the verification image set from the plurality of first extended images according to a preset ratio;

wherein obtaining training label images and verification label images by processing the plurality of label images comprises:

dividing each of the plurality of label images into a plurality of third divided images;

performing sample expansion processing on each of the plurality of third divided images, and obtaining a plurality of second extended images;

selecting the training label images and the verification label images from the plurality of second extended images according to the preset ratio.

\* \* \* \* \*